United States Patent [19]
Hara

[11] Patent Number: 5,774,167
[45] Date of Patent: Jun. 30, 1998

[54] IMAGE PROCESSING DEVICE WITH DOT DIAMETER CONTROL

[75] Inventor: Kenji Hara, Ebina, Japan

[73] Assignee: Fuji Xerox Co., Ltd., Tokyo, Japan

[21] Appl. No.: 596,446

[22] Filed: Feb. 2, 1996

[30] Foreign Application Priority Data

Feb. 2, 1995 [JP] Japan ................................. 7-016200
Jan. 31, 1996 [JP] Japan ................................. 8-015680

[51] Int. Cl.[6] .................................................. B41J 2/45
[52] U.S. Cl. ........................... 347/254; 348/298; 347/131
[58] Field of Search .................... 347/251, 256, 347/240, 131; 358/298; 395/101, 107, 109, 111; 399/181, 180, 138

[56] References Cited

U.S. PATENT DOCUMENTS

| | | | |
|---|---|---|---|
| 5,054,099 | 10/1991 | Wakabayashi et al. | 358/457 |
| 5,075,780 | 12/1991 | Shibahara | 358/298 |
| 5,467,422 | 11/1995 | Itihara et al. | 358/298 |
| 5,473,440 | 12/1995 | Haneda et al. | 358/298 |
| 5,486,927 | 1/1996 | Koizumi et al. | 358/298 |

FOREIGN PATENT DOCUMENTS

| | | |
|---|---|---|
| A-53-22309 | 3/1978 | Japan . |
| A-61-154271 | 7/1986 | Japan . |
| A-61-170185 | 7/1986 | Japan . |
| A-63-124667 | 5/1988 | Japan . |
| A-1-303869 | 12/1989 | Japan . |
| A-4-369968 | 12/1992 | Japan . |

*Primary Examiner*—Mark J. Reinhart
*Attorney, Agent, or Firm*—Oliff & Berridge, PLC

[57] ABSTRACT

When binary image data is outputted from a FIFO buffer, a first black pixel counting circuit counts black pixels in a 3×3 matrix having a target pixel at its center to produce a count value BK2. Similarly, a second black pixel counting circuit counts black pixels in a 17×9 matrix to produce a count value BK1. Based on the count values BK1 and BK2, a value indicating the dot diameter is outputted from the output value table while a look-up table and the output value table are sequentially referred to. Setting is so made that the dot diameter becomes smaller as the count values BK1 and BK2 decrease.

14 Claims, 14 Drawing Sheets

B : BLACK PIXEL
☐ : WHITE PIXEL

|   | a | b | c | d | e | f | g | h | i | j | k | l | m | n | o | p | q |
|---|---|---|---|---|---|---|---|---|---|---|---|---|---|---|---|---|---|
| 1 | - | - | - | - | - | - | - | - | - | - | - | - | - | - | - | - | - |
| 2 | - | - | - | - | - | - | - | - | - | - | - | - | - | - | - | - | - |
| 3 | - | - | - | - | - | - | - | - | - | - | - | - | - | - | - | - | - |
| 4 | - | - | - | - | - | - | - | - | - | - | - | - | - | - | - | - | - |
| 5 |   |   |   |   |   |   |   |   | ○ | B | - | - | - | - | - | - | - |
| 6 | B | B | B | B | B | B | B | B | B | - | - | - | - | - | - | - | - |
| 7 | - | - | - | - | - | - | - | - | - | - | - | - | - | - | - | - | - |
| 8 | - | - | - | - | - | - | - | - | - | - | - | - | - | - | - | - | - |
| 9 | - | - | - | - | - | - | - | - | - | - | - | - | - | - | - | - | - |

FIG. 3B

OUTPUT RESULT

|   | a | b | c | d | e | f | g | h | i | j | k | l | m | n | o | p | q |
|---|---|---|---|---|---|---|---|---|---|---|---|---|---|---|---|---|---|
| 1 | - | - | - | - | - | - | - | - | - | - | - | - | - | - | - | - | - |
| 2 | - | - | - | - | - | - | - | - | - | - | - | - | - | - | - | - | - |
| 3 | - | - | - | - | - | - | - | - | - | - | - | - | - | - | - | - | - |
| 4 | - | - | - | - | - | - | - | - | - | - | - | - | - | - | - | - | - |
| 5 |   |   |   |   |   |   |   |   | ▨ | B | - | - | - | - | - | - | - |
| 6 | B | B | B | B | B | B | B | B | B | - | - | - | - | - | - | - | - |
| 7 | - | - | - | - | - | - | - | - | - | - | - | - | - | - | - | - | - |
| 8 | - | - | - | - | - | - | - | - | - | - | - | - | - | - | - | - | - |
| 9 | - | - | - | - | - | - | - | - | - | - | - | - | - | - | - | - | - |

B : BLACK PIXEL
□ : WHITE PIXEL
- : PIXEL NOT CONCERNED
○ : TARGET PIXEL

|   | a | b | c | d | e | f | g | h | i | j | k | l | m | n | o | p | q |
|---|---|---|---|---|---|---|---|---|---|---|---|---|---|---|---|---|---|
| 4 | - | - | - | - | - | - | - | - | - |   |   | - | - | - | - | - | - |
| 5 |   |   |   |   |   |   |   |   | ○ |   | B | - | - | - | - | - | - |
| 6 | B | B | B | B | B | B | B | B | B | B |   | - | - | - | - | - | - |

|   | a | b | c | d | e | f | g | h | i | j | k | l | m | n | o | p | q |
|---|---|---|---|---|---|---|---|---|---|---|---|---|---|---|---|---|---|
| 4 | - | - | - | - | - | - | - | - | - | - |   | - | - | - | - | - | - |
| 5 |   |   |   |   |   |   |   |   | ○ |   |   | B | - | - | - | - | - |
| 6 | B | B | B | B | B | B | B | B | B | B | B |   | - | - | - | - | - |

|   | a | b | c | d | e | f | g | h | i | j | k | l | m | n | o | p | q |
|---|---|---|---|---|---|---|---|---|---|---|---|---|---|---|---|---|---|
| 4 | - | - | - | - | - | - | - | - | - | - | - |   | - | - | - | - | - |
| 5 |   |   |   |   |   |   |   |   | ○ |   |   |   | B | - | - | - | - |
| 6 | B | B | B | B | B | B | B | B | B | B | B | B |   | - | - | - | - |

|   | a | b | c | d | e | f | g | h | i | j | k | l | m | n | o | p | q |
|---|---|---|---|---|---|---|---|---|---|---|---|---|---|---|---|---|---|
| 4 | - | - | - | - | - | - | - |   |   |   | - | - | - | - | - | - | - |
| 5 | - |   |   |   |   |   |   |   | ○ | B | - | - | - | - | - | - | - |
| 6 | - | B | B | B | B | B | B | B | B |   | - | - | - | - | - | - | - |

|   | a | b | c | d | e | f | g | h | i | j | k | l | m | n | o | p | q |
|---|---|---|---|---|---|---|---|---|---|---|---|---|---|---|---|---|---|
| 4 | - | - | - | - | - | - | - |   |   |   | - | - | - | - | - | - | - |
| 5 | - | - | - | - | - | - |   |   | ○ | B | - | - | - | - | - | - | - |
| 6 | - | - | - | - | - | - | B | B | B |   | - | - | - | - | - | - | - |

0: WHITE PIXEL
1: BLACK PIXEL
2: PIXEL NOT CONCERNED

FIG. 6

PATTERN GROUP B

PATTERN GROUP C

|     | NUMBER OF BLACK PIXELS | NUMBER OF BLACK/WHITE CHANGING POINTS |
| --- | --- | --- |
| (a) | 27 | 22 |
| (b) | 27 | 44 |
| (c) | 27 | 96 |

IMAGE PROCESSING DEVICE WITH DOT DIAMETER CONTROL

BACKGROUND OF THE INVENTION

1. Field of the Invention

The present invention relates to an image processing device suitable for use in a copying machine, a printer, or the like.

2. Discussion of the Prior Art

In a copying machine or the like, it is a common process that multi-valued input image data is converted into binary image data, the binary image data is stored, the binary image data is subjected to various kinds of processing such as rotation, enlargement, reduction, and combining, and then the binary image data thus processed is outputted. This is because the memory capacity, for instance, can be saved greatly by converting multi-valued image data into binary one. However, outputting the binary image data as it is causes considerable deterioration of the image quality. To cope with this problem, there are proposed techniques of estimating and restoring original multi-valued image data on the basis of its binary counterpart, and outputting restored multi-valued image data (Published Unexamined Japanese Patent Application Nos. Sho. 53-22309 and Sho. 61-154271, etc.).

In a xerographic image output device, the dot diameter is often increased in a low-density region (where dots are sparsely distributed). For example, the dot diameter in a low density region becomes approximately two times as large as that in a high-density region. This is because although the dot diameters in these two regions are the same in the state of an electrostatic latent image, toner will more likely gather at individual dots in the low-density region.

For this reason, the gradational characteristic is likely deteriorated in a low-density region. Further, the increase of the diameter of individual dots may cause granular noise that is offensive to the eye. A technique for lessening the granular noise is known (Published Unexamined Japanese Patent Application No. Hei. 1-303869) in which low-density regions are forcibly changed to full-white regions.

Among the above-mentioned techniques, the techniques disclosed in the publications 53-22309 and 61-154271 requires a very complex process to estimate and restore original multi-valued image data from its binary counterpart, such as extraction of a characteristic quantity of an image. The technique disclosed in the publication 1-303869 can indeed reduce the granular noise, but it inevitably suffers from deterioration of the halftone characteristic in low-density regions.

SUMMARY OF THE INVENTION

The present invention has been made in view of the above circumstances, and has an object of providing an image processing device which can improve the quality of a binary image by simple processing.

Another object of the invention is to provide an image processing device which can minimize deterioration of the image quality due to granular noise in low-density regions while securing good solid black performance in high-density regions.

According to one aspect of the present invention, there is provided an image processing device comprising:

first area determining means for determining a first area around a target pixel of binary image data;

first density calculating means for calculating a density of the determined first area based on pixel values in the first area; and dot area control means for controlling a dot area of the target pixel so that the dot area of the target pixel becomes smaller as the calculated density of the first area becomes smaller.

According to another aspect of the invention, there is provided an image processing method comprising the steps of:

determining a first area around a target pixel of binary image data;

calculating a density of the determined first area based on pixel values in the first area; and controlling a dot area of the target pixel so that the dot area of the target pixel becomes smaller as the calculated density becomes smaller.

BRIEF DESCRIPTION OF THE DRAWINGS

FIG. 3A shows an example of a pattern condition;

FIG. 3B shows an output result corresponding to the pattern condition of FIG. 3A;

FIGS. 4A to 4E show other examples of pattern conditions;

FIGS. 5–7 show examples of pattern groups;

FIGS. 8A–8D show why judging the kind of a reference area based only on the number of black pixels is improper;

DETAILED DESCRIPTION OF THE PREFERRED EMBODIMENTS

1. Principle of operation 1.1 Smoothing

Figure 2A:
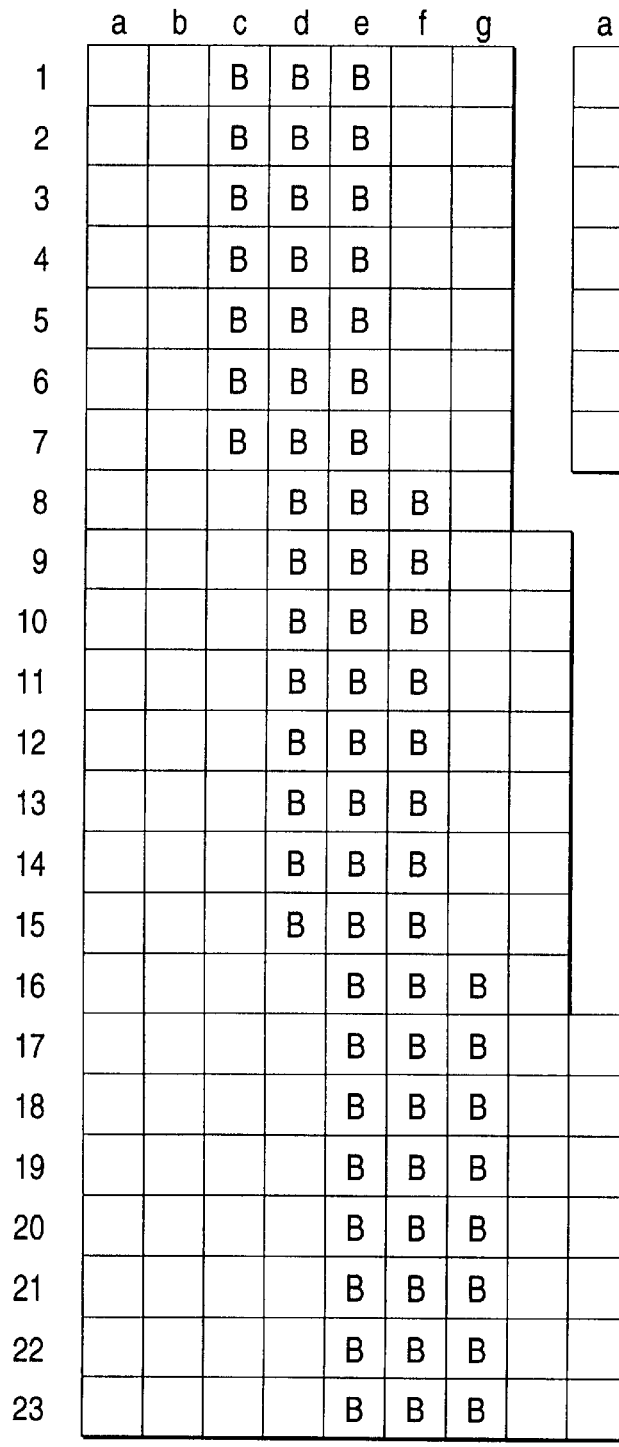
FIGS. 2A and 2B show image data before and after being subjected to smoothing.

The principle of operation of smoothing according to this embodiment will be described with reference to FIGS. 2A and 2B. FIG. 2A shows image data before it is subjected to smoothing. In the figure, each block corresponds to one pixel. The position of each pixel is specified by using one of coordinate values a, b, c, . . . in the main scanning direction and one of coordinate values 1, 2, 3, . . . in the auxiliary scanning direction, as "b3", for instance. Pixels given a character "B" are full-black pixels, and pixels with no marking are full-white pixels. In FIG. 2A, every pixel is either a full-black or full-white pixel.

Figure 2B:
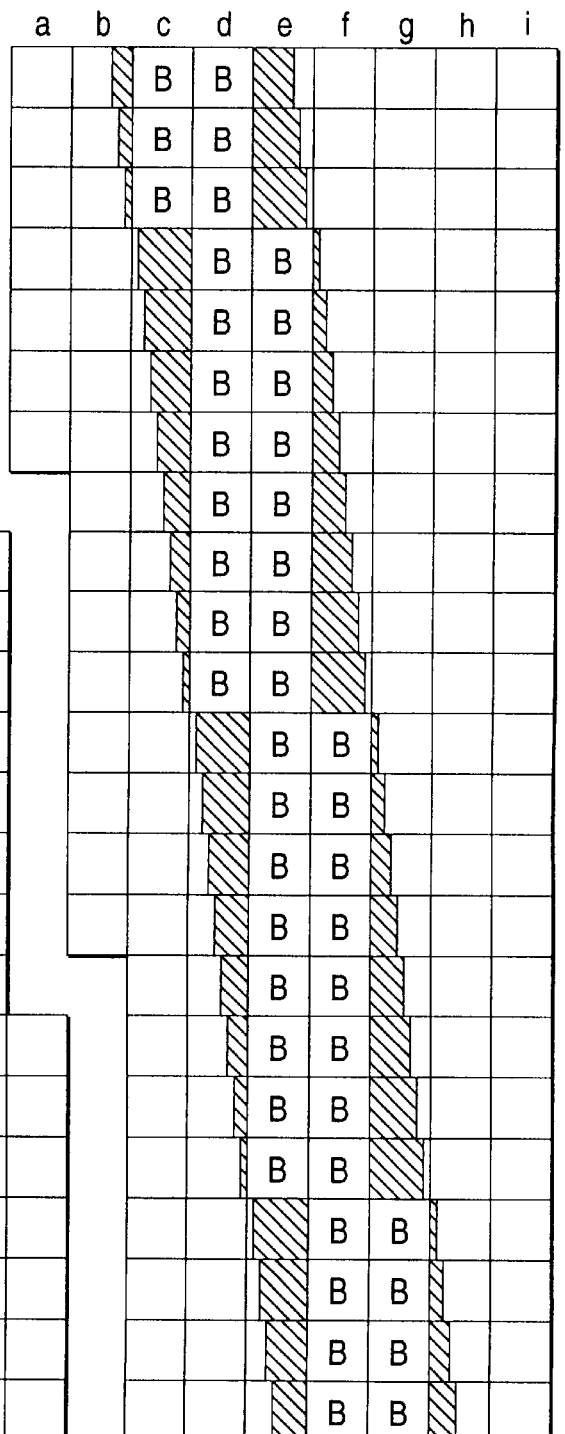

Image data formed by smoothing the image data of FIG. 2A is shown in FIG. 2B. In FIG. 2B, the black portion of a partially black pixel (hereinafter called a "smoothing pixel") is hatched. As seen from these figures, for example, the fullblack pixels "c4" to "c7" and the full-white pixels "c8" to "c11" in FIG. 2A are converted into the smoothing pixels in FIG. 2B. The area of the black portion of these smoothing pixels decreases as the position in the auxiliary scanning direction goes downward. The other pixels in the edge portion are converted into smoothing pixels in the same manner.

In the case of the full-black pixels belonging to the left-side edge portion of FIG. 2A, there is a repetition of a pattern in which eight consecutive full-black pixels in the auxiliary scanning direction are followed by one-pixel shift in the main scanning direction. On the other hand, in FIG. 2B, the area of the black portion of the smoothing pixels "c4" to "c11" decreases in the auxiliary scanning direction in steps of approximately ⅛ of one pixel width. In this way, the area of the black portion of each smoothing pixel must be determined in connection with the adjacent pixels; otherwise, the smoothing operation cannot be carried out properly.

In this embodiment, an image area (referred to as a "reference area") that is centered at a pixel to be processed (referred to as a "target pixel") and includes 17 pixels in the main scanning direction and 9 pixels in the auxiliary scanning direction is extracted from the image data. A judgement is made as to whether a dot pattern of the reference area satisfies any of a plural number of pattern conditions. If it satisfies one pattern condition, the area of the black portion of the target pixel is set at a value corresponding to that pattern condition.

An example of a pattern condition is shown in FIG. 3A. This condition is satisfied when with respect to the target pixel having coordinates "i5", pixels "a5" to "i5", "i4" and "j4" in the reference area are white pixels and pixels "a6" to "i6" and "j5" are black pixels. For this pattern condition, an area ratio L of a black portion is set at 46.0%. An output result of the target pixel "i5" is as shown in FIG. 3B. As for the remaining pixels in the reference area, similar processing is performed when each pixel becomes a target pixel. Other examples of pattern conditions and their black area ratios L are shown in FIGS. 4A to 4E. In these figures, every pixel marked with "–" is a "pixel not concerned with the current processing."

The image data of FIG. 2B is obtained by repeating the above pattern matching for the respective pixels of the image data of FIG. 2A. By the way, it may be the case that a reference area satisfies a plural number of pattern conditions. For example, if a reference area satisfies the pattern condition of FIG. 3A, it should satisfy the pattern conditions of FIGS. 4D and 4E. In this embodiment, in such a case, the reference area concerned is regarded as satisfying only the "pattern condition having a longest effective portion" (the effective portion means a portion excluding pixels not concerned with the current processing). For example, the pattern condition of FIG. 3A has an effective portion length of "10", and the pattern conditions of FIGS. 4A and 4B, 4D and 4E have effective portion lengths of "9" and "4", respectively. Therefore, so long as the pattern condition of FIG. 3A is satisfied, the black area ratio L is set at 46.0%. Although image data produced by a copying machine, for example, include a wide variety of contents, there is a high probability that each portion of the image data satisfies one of short-effective-portion pattern conditions (e.g., the one shown in FIG. 4E). This allows a certain level of smoothing to be performed even on complicated image data. When long-effective-portion pattern conditions (such as those shown in FIG. 4D and FIG. 3A) are satisfied at the same time, smoothing is carried out on the basis of a pattern condition having a longer effective portion. Accordingly, a better smoothing operation is carried out on that portion. Thus, in this embodiment, a variety of pattern conditions having short effective portions are prepared, and long-effective-portion pattern conditions are applied with priority given thereto over short-effective-portion pattern conditions. Accordingly, even image data produced by a copying machine, for instance, can effectively be smoothed.

1.2 Pattern Matching Method

A specific configuration to carry out the above-described "smoothing" will be described briefly. A proper logic circuit (hereinafter referred to as a pattern-condition judging circuit) can be used for judging whether each pattern condition is satisfied. Various black area ratios L may be stored in an output value-table (look-up table). The same number of pattern-condition judging circuits as the pattern conditions are so constructed as to produce an address signal for referencing the output value table when the corresponding pattern condition is satisfied.

Accordingly, each pattern-condition judging circuit produces an address signal when the corresponding pattern condition is satisfied. A selector is provided to select one of address signals produced by some of the pattern-condition judging circuits. The selector may be designed such that when address signals are outputted from a plural number of pattern-condition judging circuits, it selects an address signal corresponding to a pattern condition having the longest effective portion and transfers the selected address signal to the output value table.

To ensure satisfactory smoothing operations, several hundred pattern conditions are required. To select a proper address signal with a priority order applied to the pattern conditions, the selector becomes of a large scale.

Figure 5:
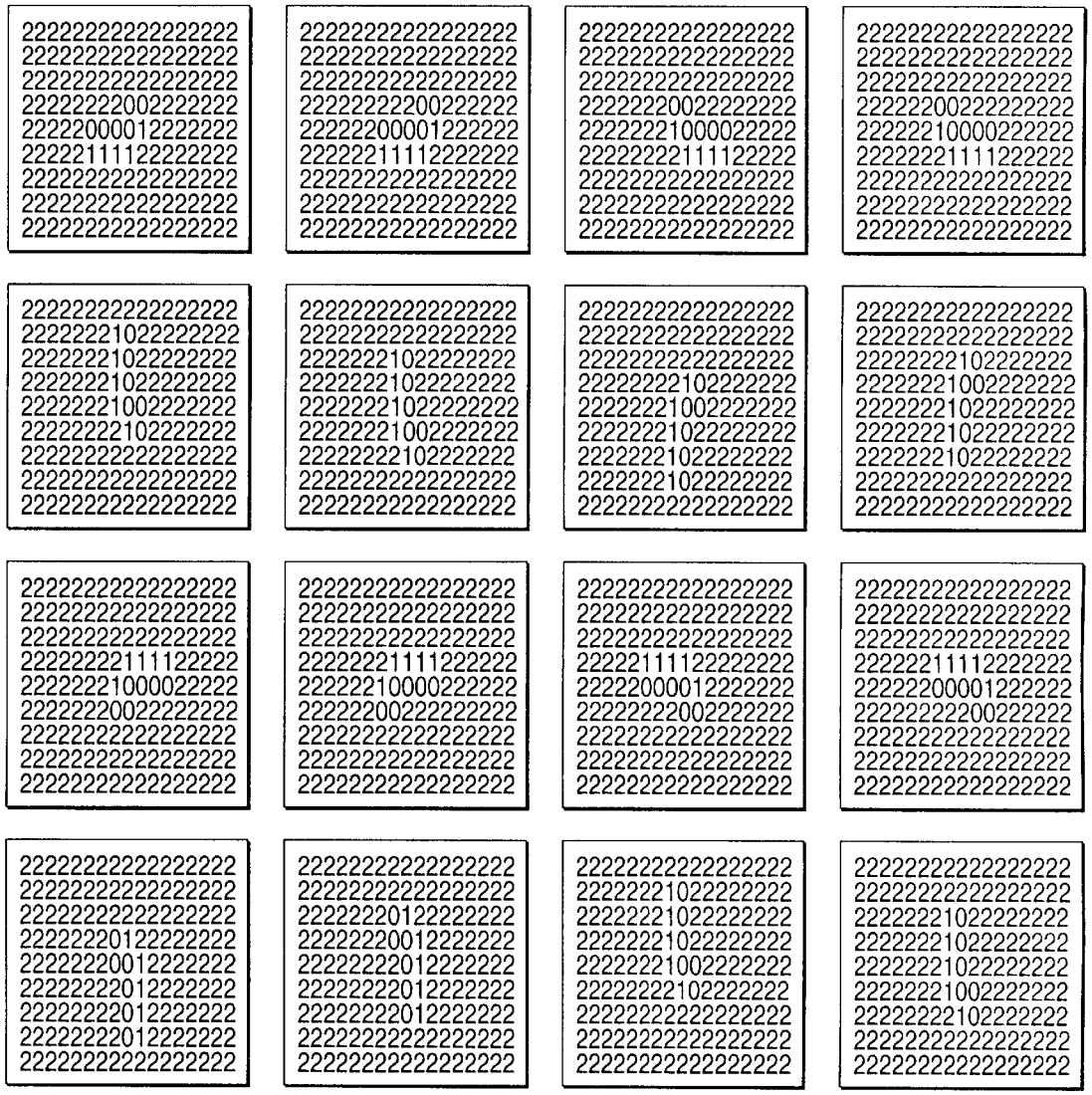
Figures 6, 7:
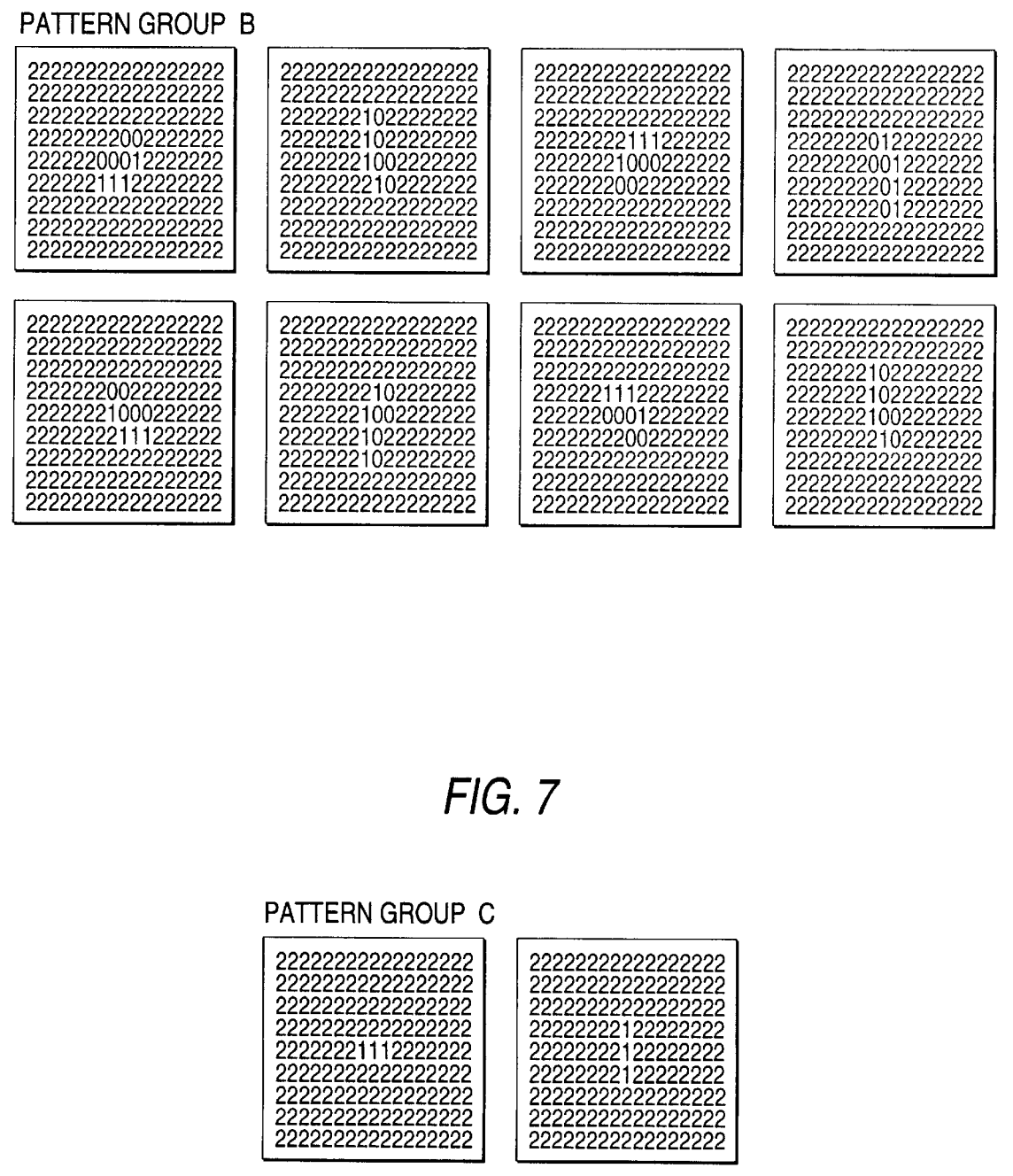

A study of the inventor revealed that the circuit scale of the selector can be greatly reduced if pattern conditions that are never satisfied simultaneously are gathered into groups (pattern groups) and a priority order is determined for these pattern groups. Examples of pattern groups are shown in FIGS. 5 to 7. In these figures, "0" indicates a white pixel; "1", a black pixel; and "2", a pixel not concerned with the processing. To simplify the description, it is assumed that the longest effective portion has a length of 5.

In FIGS. 5 to 7, pattern conditions (template patterns) are classified into pattern groups A to C, respectively, in the descending order of the effective portion length. In one pattern group, a plural number of pattern conditions are not satisfied simultaneously, as a rule. Accordingly, address signals outputted from pattern-condition judging circuits belonging to one pattern group can be arranged into a single-line signal by an OR circuit, for instance. Therefore, the selector is required to perform its selecting operation only on three lines of address signals (corresponding to pattern groups A to C), and hence the selector can be much simplified.

Where pattern conditions that may be satisfied simultaneously produce address signals having the same address for referencing the output table, collision of these address signals on an address bus will create no problem. Therefore, in this embodiment, in an exceptional case, a plurality of pattern conditions that may be satisfied simultaneously are contained in one pattern group.

1.3 Restriction of Smoothing

If the smoothing is unconditionally applied to image portions of image data, the gradational characteristic of the image portion is impaired to deteriorate the image quality. For this reason, it is necessary to restrict application of the smoothing to image data. To this end, in this embodiment, it is judged whether the reference area concerned is an image area or a character area, according to a given judging method (described later in detail).

The smoothing is partially restricted for a reference area that has been judged to be an image area. That is, when a pattern condition having a long effective portion (such as those shown in FIGS. 4A–4D) is satisfied, the smoothing is applied to the target pixel. But when only a short-effective-length pattern condition (for example, the effective portion length is 4 or shorter, as exemplified by FIG. 4E) is satisfied, the smoothing is not applied to the target pixel. Since an image area is a repetition of short patterns, it can be avoided that the smoothing is applied thereto.

On the other hand, in a case where characters or a line drawing is superimposed on an image area, respective pixels constituting a character or the like will probably satisfy a long-effective-portion pattern condition. When a long-effective-portion pattern condition is satisfied, the smoothing process is applied to the target pixel. Therefore, even where characters or a line drawing is superposed on a photographic image or a mesh is applied to characters, the characters or the line drawing can be smoothed without deteriorating the gradational characteristic of the photographic image portion or mesh-applied portion.

1.4 Area Judgment

The principle of operation of judging the kind (image area or character area) of a reference area will be described.

One of the possible ways to judge the kind of a reference area is to count the number of black pixels within the reference area and check whether a count exceeds a preset value. However, this judgement method, which is based only on the number of black pixels, will not always produce correct judgment results, for the reason described below with reference to FIGS. 8A–8D.

Figure 8A:
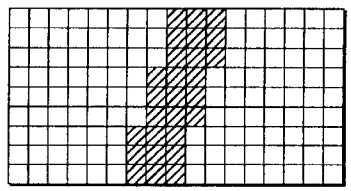
Figure 8B:
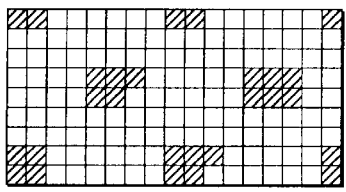
Figure 8C:
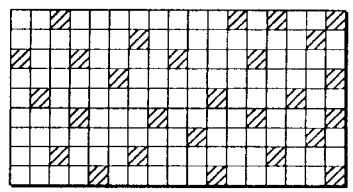

FIG. 8A shows a dot matrix of 17×9, which contains a portion of a black character. FIG. 8B and 8C respectively show a dot-concentration type dither image and an error diffusion image in matrices of the same size. FIG. 8D shows the number of black pixels and the number of black/white changing points (the number of pixel color changing points in the main and auxiliary scanning directions within the reference area) in each of FIGS. 8A–8C. As seen from part FIG. 8D, the patterns of FIGS. 8A–8C have the same number of black pixels. It is understood that it is difficult to correctly judge the kind of a reference area by using only the number of the black pixels.

Figure 9A:
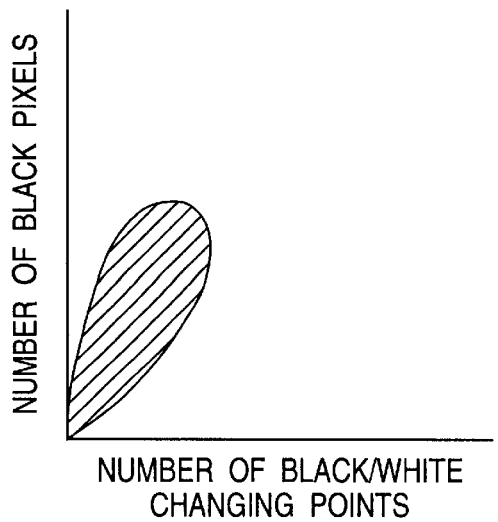
FIGS. 9A and 9B are graphs showing correlations between the number of black pixels and the number of the black/white changing points in a reference area.
Figure 9B:
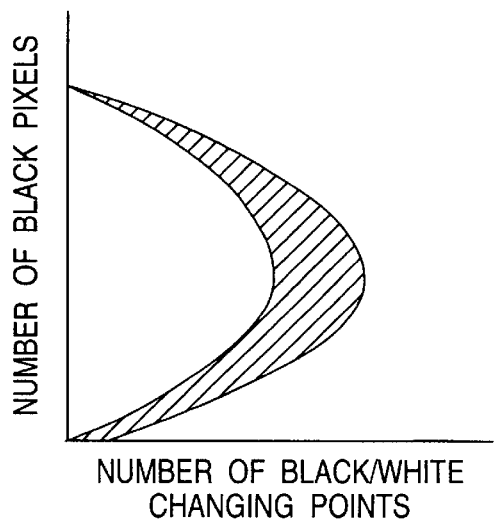
Figure 10A:
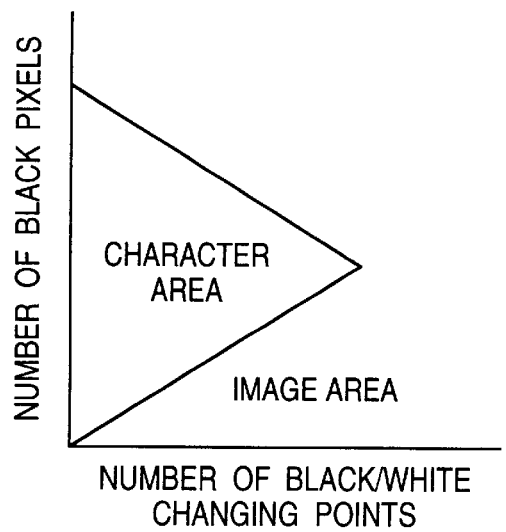
FIGS. 10A–10D are graphs showing examples of criteria to be used for judging the kind of a reference area.
Figure 10B:
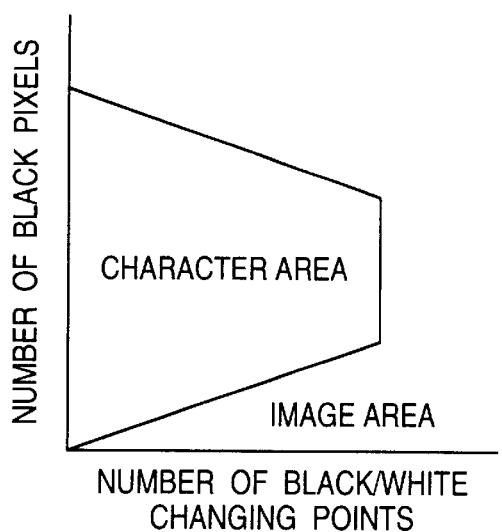
Figure 10C:
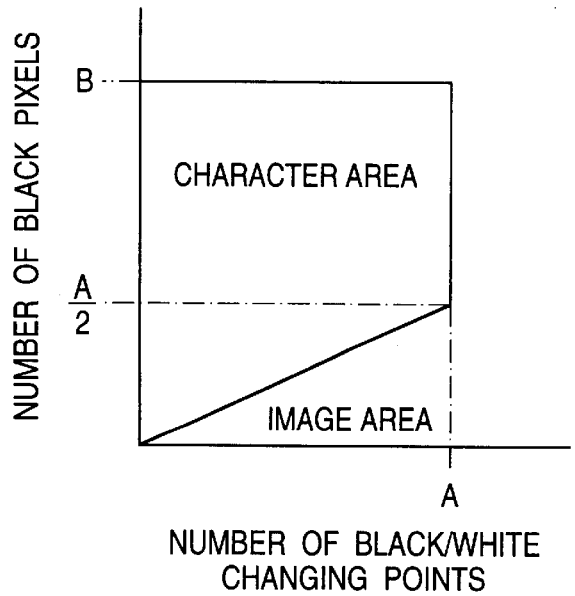
Figure 10D:
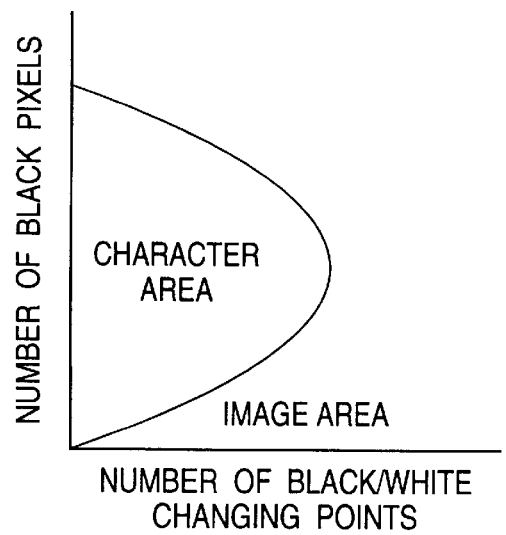

Use of only the number of the black/white changing points also fails to correctly discriminate the kind of a reference area. This is because even a dot-concentration type dither image or an error diffusion image has a smaller number of black/white changing points in a bright portion. On the other hand, a study of the inventor revealed that the correlation between the number of black pixels and the number of black/white changing points depends on the kind of a reference area. FIG. 9A shows a correlation of a character area (black characters, a line drawing, etc.), and FIG. 9B shows a correction of an image area (error diffusion image).

This relationship enables the kind of a reference area to be judged very correctly by counting the number of black pixels and the number of black/white changing points. For example, the kind of a reference area, a boundary between the character area and the image area may be set as exemplified in FIGS. 10A–10D.

1.5 Dot Diameter Control

To express gradations by a device capable of outputting only a black/white binary image, a technique called "quasi-halftone" is used in which the number of black pixels within a unit area is controlled in accordance with the density to be reproduced. In this case, it is very important how to determine the dot diameter.

Figure 11A:
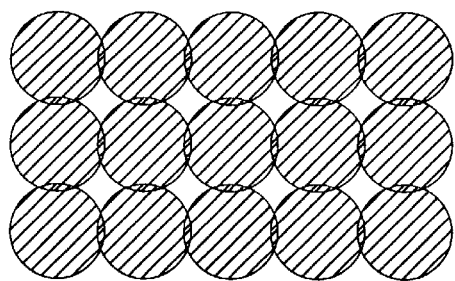
FIGS. 11A and 11B show examples of reproduction of a high-density region by use of small dots and large dots, respectively.
Figure 11B:
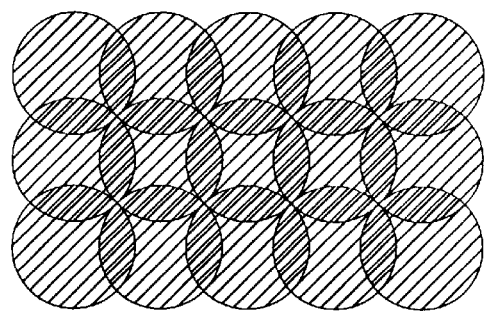

FIGS. 11A and 11B show examples of reproduction of a high-density region by use of small dots and large dots, respectively. As shown in FIG. 11B, where the dot diameter is large, the dots fill out a display region without forming any interstices. But as shown in FIG. 11A, where the dot diameter is small, interstices are formed between the dots, deteriorating the reproduction performance of solid black in a high-density region.

Figure 12A:
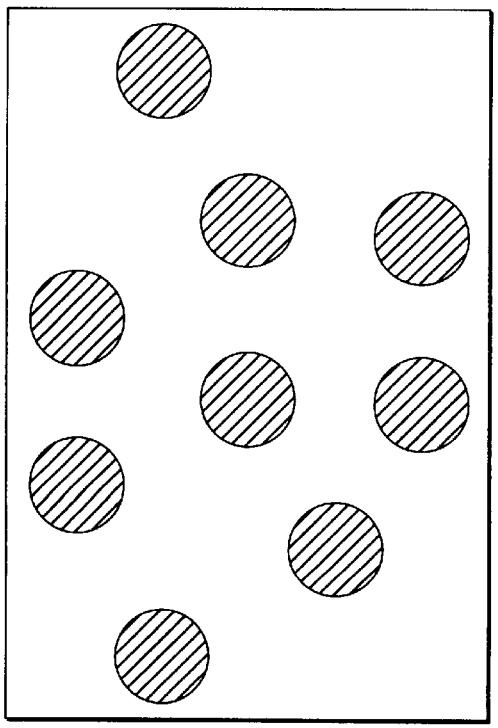
FIGS. 12A and 12B show examples of reproduction of a low-density region by use of small dots and large dots, respectively.
Figure 12B:
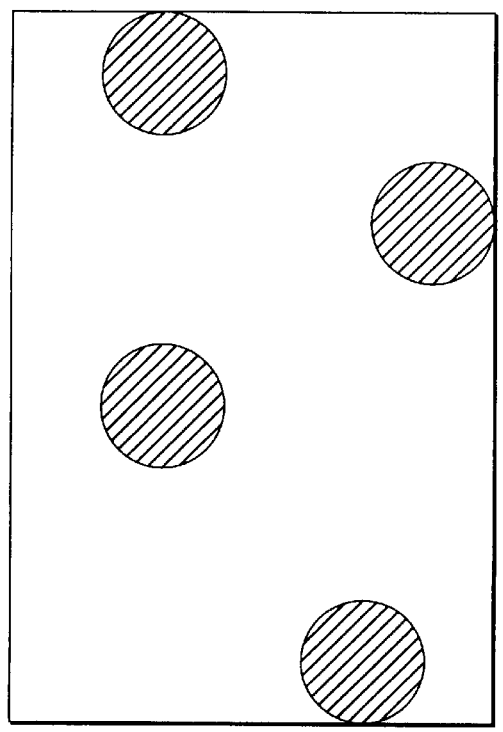

FIGS. 12A and 12B show examples of reproduction of a low-density region by use of small dots and large dots, respectively. Where the dot diameter is small, the number of dots within a fixed area can be increased (FIG. 12A). On the other hand, where the dot diameter is large, the number of dots within the fixed area is reduced (FIG. 12B), that is, large dots are sparsely distributed. Thus, an output image becomes coarse, i.e., becomes granular in a low-density region.

As described above, each of a device using dots of a large diameter and a device using dots of a small diameter has both merits and demerits.

In view of the above, in this embodiment, the dot diameter is increased for a high-density region and decreased for a low-density region, to thereby realize faithful reproduction of solid black in a high-density region as well as reduction of granularity in a low-density region. The principle of operation of this feature will be described with reference to FIG. 14.

Figure 14:
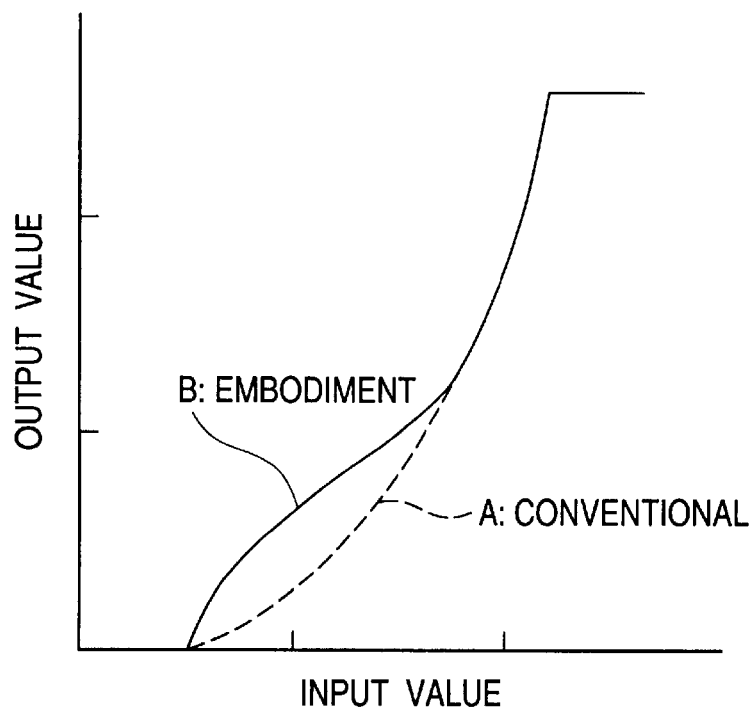
FIG. 14 is a graph showing a characteristic of conversion from multi-valued image data to quasi-halftone binary image data.

FIG. 14 is a graph showing a characteristic of conversion from multi-valued image data (horizontal axis) to quasi-halftone binary image data (vertical axis). In the figure, the horizontal axis represents the density of multi-valued image data and the vertical axis represents the value corresponding to the number of dots of binary image data per unit area. The binary image data will be converted into a dot-concentration type dither image or an error diffusion image (see FIGS. 8A and 8B) which has a density corresponding to an output value of the conversion characteristic of FIG. 14.

In FIG. 14, a characteristic curve A is used in a conventional image processing device, in which densities are obtained in accordance with input image data (multi-valued image data) when a quasi-halftone image is formed by dots of an equal diameter. A characteristic curve B, which is used in this embodiment, has a higher density than the characteristic curve A in a low density region. Therefore, it is preferable that in actually outputting binary image data, the dot diameter be reduced for low-density regions so that a final quasi-halftone image has densities that are equal to (or approximately equal to) those as would be obtained with the characteristic curve A. In this manner, the device can realize faithful reproduction of solid black in a high-density region as well as reduction of granularity in a low-density region.

The control of the dot diameter can be performed by the method disclosed in Published Unexamined Japanese Patent Application No. Sho. 63-124667.

1.6 Control of Dot Diameter by Using Matrices

The control of the dot diameter at the time of outputting an image will be described in more detail. As described above, final densities can be made equal to those as would be obtained with the characteristic curve A if the dot diameter is controlled in accordance with the density (horizontal axis of FIG. 14) of multi-valued image data. However, usually multi-valued image data is discarded immediately after it is converted into binary image data, in which case the multi-valued image data does not exist when the image is outputted. Accordingly, the dot diameter control needs to be performed while the density of multi-valued image data is estimated on the basis of a dot-concentration type dither image or an error diffusion image (see FIGS. 8A and 8B).

The density of multi-valued image data can be estimated by counting the number of black pixels within a reference area. In this case, however, it is very important what size the reference area should have.

If the reference area is set small (e.g., a matrix of 3×3 is used), the dot diameter of a target pixel is determined on the basis of a small area around the target pixel. This makes it difficult to perform smooth gradation control.

On the other hand, if the reference area is set large (e.g., a matrix of 17×9 is used), the dot diameter of a target pixel is determined on the basis of a relatively large area around the target pixel. Therefore, it is possible to perform smooth gradation control. However, another problem arises that smooth gradation control is also applied to an image portion to be subjected to sharp one (e.g., edges of black characters and a line drawing).

Figure 13:
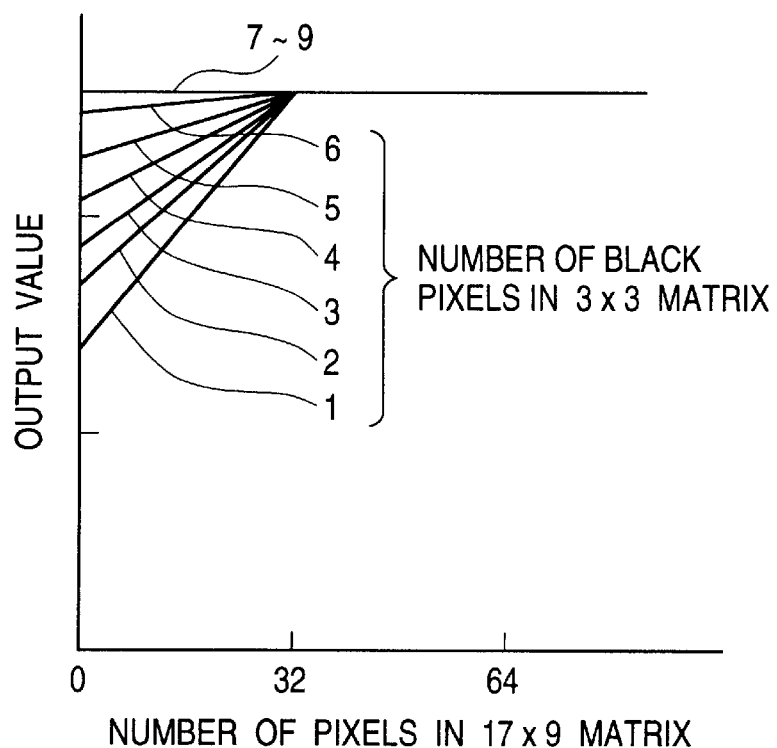
FIG. 13 is a graph showing how the dot diameter is determined by using two matrices.

In view of the above, in this embodiment, two matrices, i.e., large and small matrices (17×9 and 3×3) are used to determine the dot diameter. Referring to FIG. 13, the horizontal axis represents the number of black pixels in a matrix of 17×19, and the vertical axis represents the output value corresponding to the dot diameter. As the output value increases, the dot diameter becomes large. One of a plural number of characteristics is selected in accordance with the number of black pixels (1 to 9) in a 3×3 matrix.

1.7 Conversion to Multi-valued Data Performed Only on Black Pixels

The above-described dot diameter control may be regarded as a process of converting binary image data into multi-valued image data. There may be conceived a method in which every pixel of binary image data is used as a target pixel and the dot diameter is determined on the basis of the number of black pixels around it (in a 3×3 matrix). An example of this method is illustrated in FIG. 15C, which is a result of conversion of input binary image data shown in FIG. 15A to multi-valued image data.

Figure 15A:
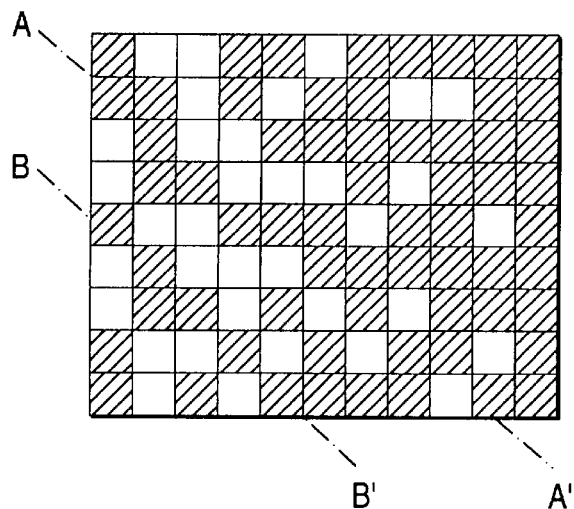
FIGS. 15A–15C illustrate why conversion to multi-valued image data is performed only on black pixels in the embodiment.
Figure 15B:
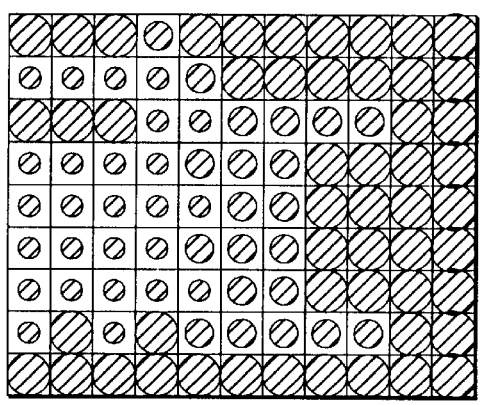
Figure 15C:
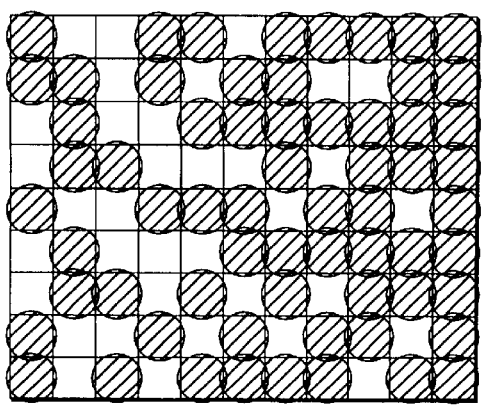

In the pattern of FIG. 15A, it appears that something like a portion of a line drawing exists along straight lines A—A' and B—B'. But "something like a portion of a line drawing" is not found at all in the pattern of FIG. 15B. In contrast, in this embodiment, the conversion into multi-valued image data is applied only to black pixels. FIG. 15C shows an example of multi-valued image data formed according to this embodiment. It is clearly seen from FIG. 15C that "something like a portion of a line drawing" existing along the straight lines A—A' and B—B' is preserved, which evidences high image reproduction performance.

1.8 Switching between Smoothing and Dot Diameter Control

Let us consider the possibility that both of the above-mentioned smoothing and dot diameter control are applied to the same target pixel. As described above, where the target pixel concerned belongs to an image portion, the smoothing process should not be performed. That is, only the dot diameter control should be performed.

Figure 19A:
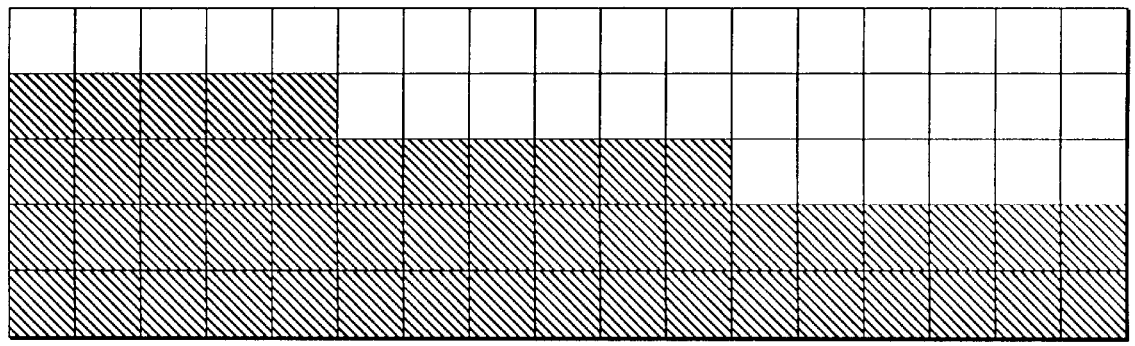
FIGS. 19A–19C illustrate why dot diameter control should not be performed on black pixels and a line drawing.
Figure 19B:
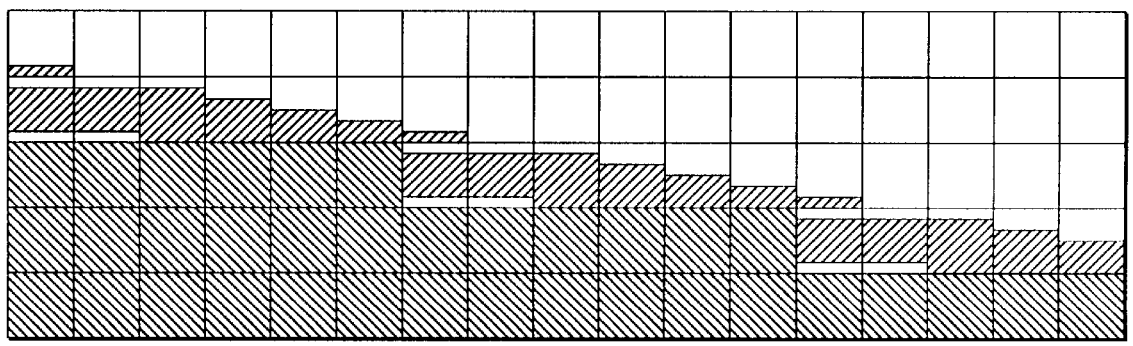
Figure 19C:
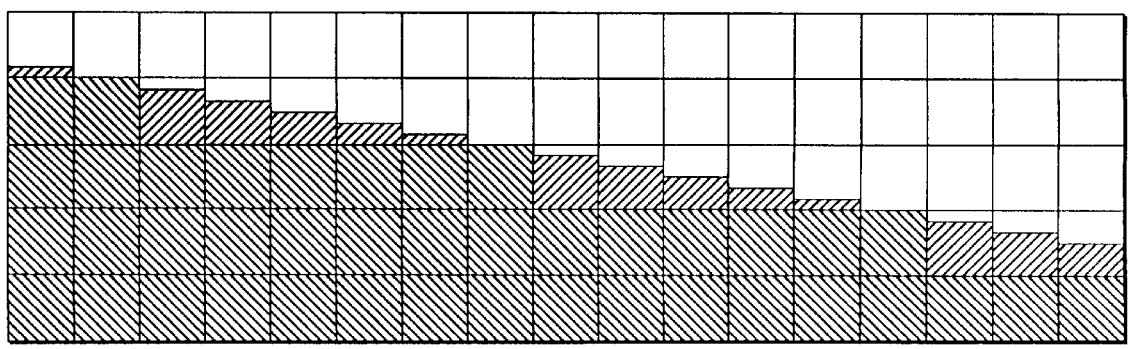

On the other hand, the dot diameter control should not be applied to black characters, a line drawing, and the like. The reason for this will be described with reference to FIGS. 19A–19C. FIG. 19A shows an input binary image before being subjected to smoothing, and FIG. 19C shows a corresponding image after being subjected to the normal smoothing. FIG. 19B shows a corresponding output binary image that would be obtained if not only the smoothing but also the dot diameter control were performed. As seen, the image is not in proper shape in its edge portion, which leads to deterioration of the image quality such as a blurred edge.

Thus, it is necessary to selectively perform the smoothing and the dot diameter control in accordance with the kind of pixel (whether it constitutes black characters, a line drawing or the like, or an image portion). Some measure needs to be provided to prevent the smoothing and the dot diameter control from being performed simultaneously. As a specific measure, a selector may be used which selects either the smoothing or the dot diameter control in accordance with the kind of pixel.

It is noted that the concepts of the "pixel constituting black characters, a line drawing, or the like" and the "pixel constituting an image portion" are different from the "character area" and the "image area" which were described above in connection with FIGS. 10A–10D. That is, the "character area" and the "image area" are terms used for describing the nature of the whole reference area (e.g., a 17×9 matrix), and not the nature of individual pixels. On the other hand, the judgement of whether a pixel is a "pixel constituting black characters, a line drawing, or the like" or a "pixel constituting an image portion" is made on a pixel-by-pixel basis.

Accordingly, there occurs a case where "pixels constituting black characters, a line drawing, or the like" and "pixels constituting an image portion" coexist in an "image area", as a matter of course. The discrimination between a "pixel constituting black characters, a line drawing, or the like" and a "pixel constituting an image portion" is indicated by a selection signal (i.e., a final-stage selector selection signal F_SEL, which will be described in detail with reference to Table 2) supplied to the selector.

2. Configuration of Embodiment 2.1 Overall Configuration of Embodiment

A configuration of an image processing device according to the embodiment of the invention will be described with reference to FIG. 1.

Figure 1:
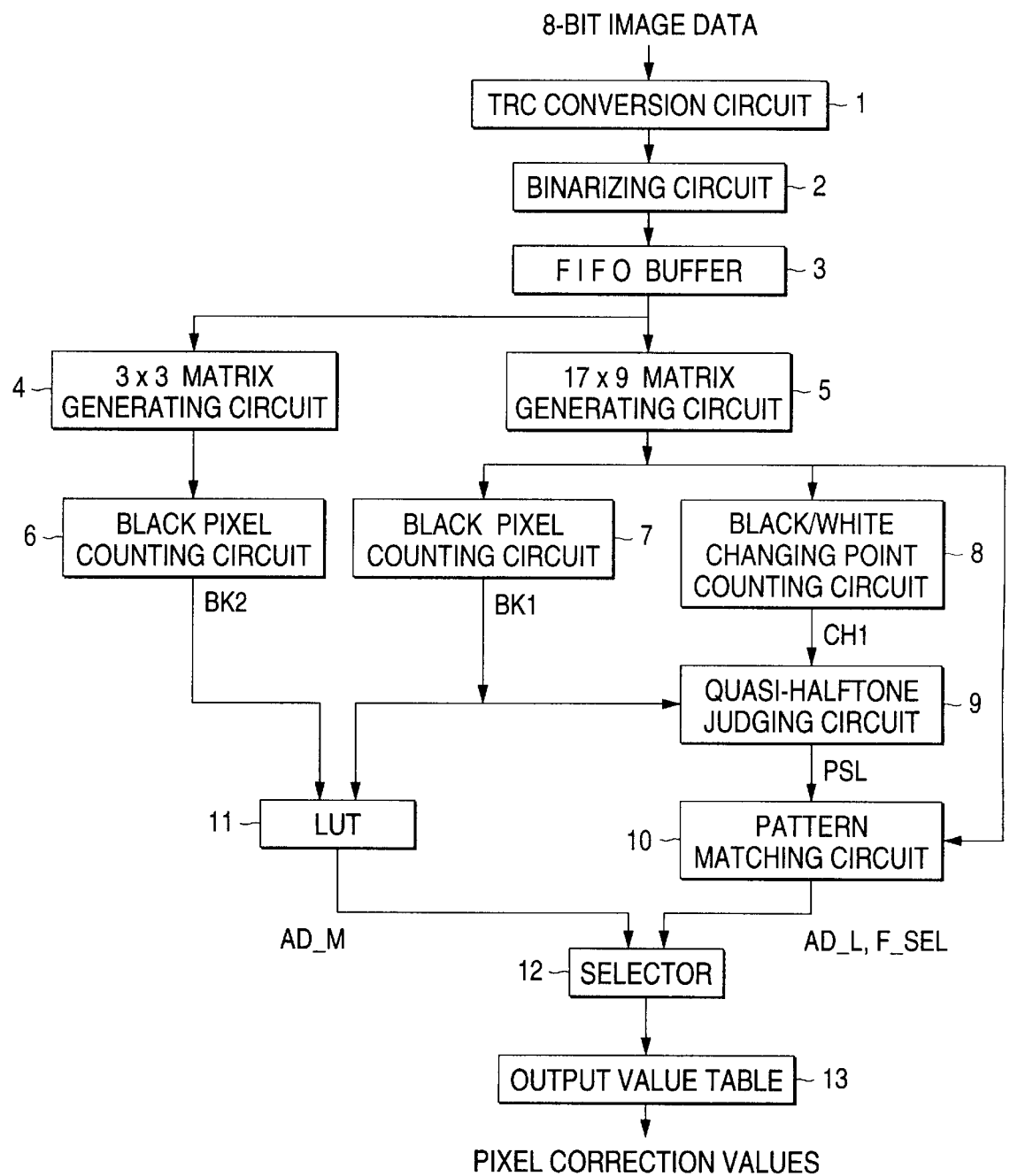
FIG. 1 is a block diagram showing a configuration of an image processing device according to an embodiment of the present invention.

In FIG. 1, a TRC conversion circuit 1 receives multi-valued image data from an image input terminal (not shown), converts the gradational characteristic of the multi-valued image data according to characteristic B of FIG. 14, and outputs converted multi-valued image data.

A binarizing circuit 2 receives the multi-valued image data sent from the TRC conversion circuit 1, and converts it into binary image data (error diffusion image data). A FIFO buffer 3 sequentially stores the binary image data sent from the binarizing circuit 2 while successively discarding old data. A matrix generating circuit 4 extracts, from the FIFO buffer 3, a 3×3 matrix which includes a target pixel at the center thereof. The target pixel is a pixel at a given address in the FIFO buffer 3. Another matrix generating circuit 5 extracts a 17×9 matrix from the FIFO buffer 3 in the similar manner.

A black-pixel counting circuit 6 counts black pixels existing in the 3×3 matrix, and outputs a count number BK1. Similarly, a black-pixel counting circuit 7 counts black pixels existing in the "17×9" matrix, and outputs a count number BK2. A black/white changing point counting circuit 8 counts black/white changing points in the 17×9 matrix, and outputs a count number CH1.

A quasi-halftone judging circuit 9 judges whether the reference area (defined by the 17×9 matrix) is a character area or an image area, according to one of the characteristics shown in FIGS. 10A to 10D, and produces an image kind judgment signal PSL. Specifically, the image kind judgment signal PSL is set at "0" if the reference area is judged to be a "character area," and at "1" if the reference area is judged to be an "image area." The quasi-halftone judging circuit 9 may be implemented as a look-up table which stores image kind judgment signals PSL, and is referenced by address signals that are the number BK1 of black pixels and the number CK1 of black/white changing points.

Table 1 shows a memory map of an output value table (look-up table) 13.

TABLE 1

| | | Contents | Printing position |
|---|---|---|---|
| ↑ | | Full-white pattern | — |
| | | Smoothing pixel (L = 0%) | Left |
| | | Smoothing pixel (L = 0%) | Right |
| AD_L | | Smoothing pixel (L = 1%) | Left |
| | | Smoothing pixel (L = 1%) | Right |
| | | . | . |
| | | . | . |
| | | . | . |
| | | Smoothing pixel (L = 100%) | Right |
| ↑ | ↓ | Full-black pattern (M = 100%) | Center |
| | | Dot diameter control pixel (M = 98%) | Center |
| AD_M | | . | . |
| | | . | . |
| | | . | . |
| ↓ | | Dot diameter control pixel (M = 0%) | Center |

As shown in Table 1, the output value table 13 stores a full-white pattern and area ratios L corresponding to various smoothing pixels (FIGS. 3A and 3B and FIGS. 4A–4D), as well as a full-black pattern and area ratios M (corresponding to the vertical axis of FIG. 13) corresponding to various dot-diameter control pixels. A look-up table 11 produces an address signal AD_M for accessing the full-black pattern or one of the dot-diameter control pixels in the output-value table 13, based on the numbers BK1 and Bk2 of black pixels.

A pattern matching circuit 10 produces an address signal AD_L and a final-stage selector selection signal F_SEL based on the 17×9 matrix and the image kind judgment signal PSL. The address signal AD_L serves to designate the full-white pattern, one of the smoothing pixels, or the full-black pattern whose area ratio M is 100% in the output value table 13 (described later in detail). A selector 12 forwards the address signal AD_L to the output value table 13 when the final-stage selector selection signal F_SEL is "1", and forwards the address signal AD_M to the output value table 13 when the selection signal F_SEL is "0".

Based on the received address signal, the output value table 13 produces pixel correction values, which indicate, for instance, a laser beam emitting duration and timing. Upon reception of the pixel correction values, a given image output device (not shown) produces a dot on a printing sheet in accordance with the pixel correction values.

2.2 Configuration of Pattern Matching Circuit 10

Figure 16:
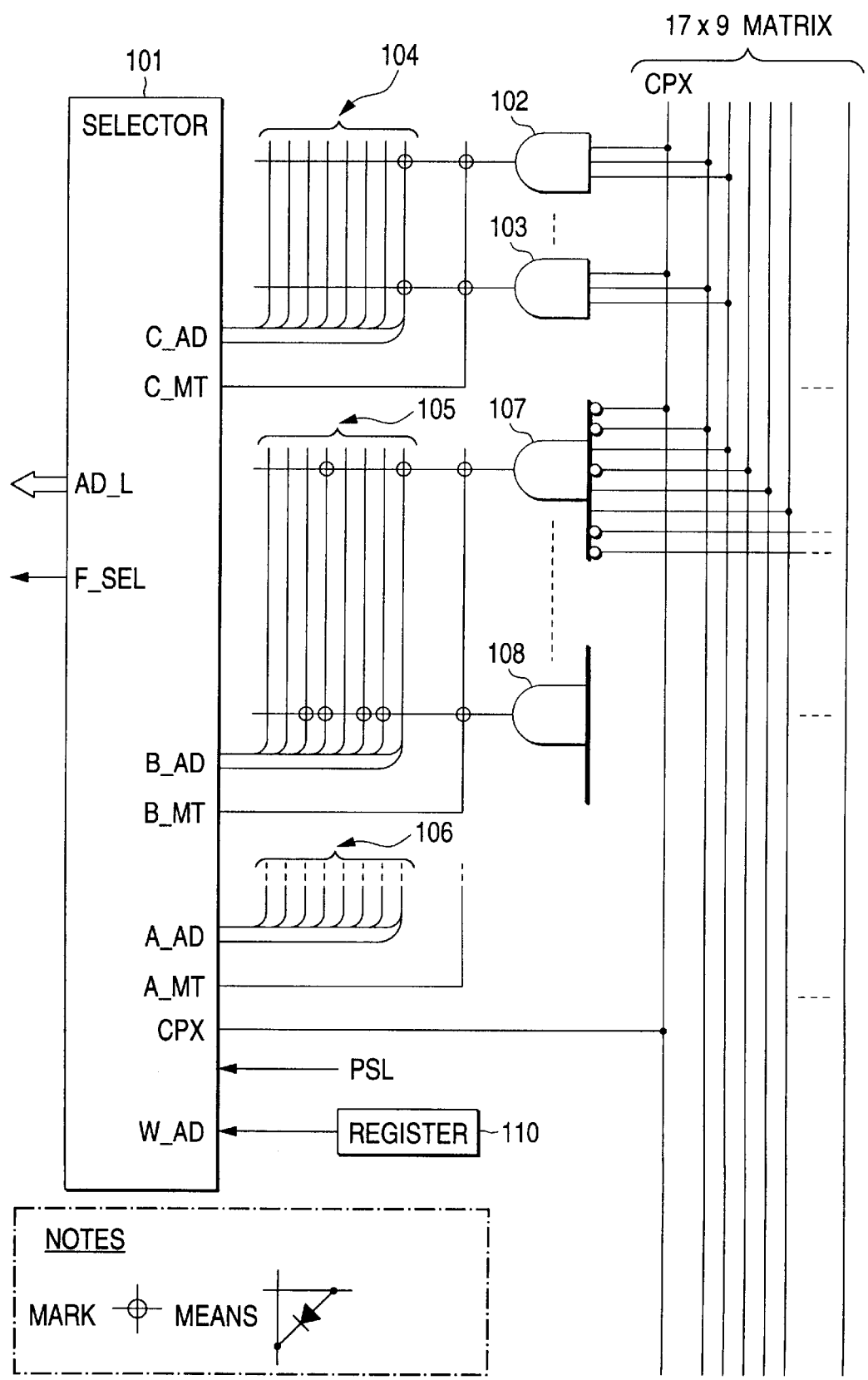
FIG. 16 shows a detailed configuration of a pattern matching circuit used in the image processing device of FIG. 1.

A detailed configuration of the pattern matching circuit 10 will be described with reference to FIG. 16. In the figure, an AND circuit 102 produces a logical product of a target pixel CPX and two pixels adjacent thereto in the main scanning direction. That is, the AND circuit 102 judges whether the pattern condition on the left side in FIG. 7 is satisfied. Reference numeral 104 designates a group-C address bus, the levels of all bits of which are pulled down to "0" by resistors (not shown). Part of the bits of the bus 104 are connected through diodes to the output terminal of the AND circuit 102.

When the output signal of the AND circuit 102 turns "1", the above part of the bits connected thereto also become "1". The bits of the group-C address bus 104 serve to designate the address at which "full-black pattern (M=100%)" is stored in the output value table 13. An AND circuit 103 produces a logical product of a target pixel CPX and two pixels adjacent thereto in the auxiliary scanning direction. That is, the AND circuit 103 judges whether the pattern condition on the right side in FIG. 7 is satisfied. The output terminal of the AND circuit 103 is connected through diodes to part of the bits of the group-C address bus 104 in accordance with the address to be accessed in the output value table 13. Also in this case, the address to be accessed is the address of "full-black pattern (M=100%)."

It may occur that the pattern conditions associated with the AND circuits 102 and 103 are simultaneously satisfied. However, collision of these address signals on the group-C address bus 104 causes no problem, because the same address in the output value table 13 is to be accessed.

An AND circuit similar to the AND circuits 102 and 103 is provided for each of the remaining pattern conditions belonging to the pattern group C. Each of these AND circuits produces a signal 1" when the corresponding pattern condition is satisfied. The output terminal of each of these AND circuits is connected through diodes to part of the bits of the group-C address bus 104 in accordance with the address to be accessed. Output signals of all the AND circuits belonging to the pattern group C are ORed, and a result is supplied, in the form of a group-C match signal C_MT, to a selector 101.

That is, the group-C match signal C_MT becomes "1" when any of the pattern conditions of the pattern group C is satisfied. An address signal on the group-C address bus 104 is supplied, as a group-C address signal C_AD, to the selector 101. Circuitry similar to that of the pattern group C is provided for each of the pattern groups B and C.

When the 17×9 matrix satisfies any of the pattern conditions of the pattern group B, a group-B address signal B_AD corresponding to the satisfied pattern condition is supplied to the selector 101, and a group-B match signal C_MT is set at "1". Similarly, when the 17×9 matrix satisfies any of the pattern conditions of the pattern group A, a group-A address signal A_AD corresponding to the satisfied pattern condition is supplied to the selector 101, and a group-A match signal A_MT is set at "1".

An address indicated by the address signals A_AD or B_AD corresponds to a smoothing pixel having a certain area ratio L (see Table 1). A register 110 stores the address of the full-white pattern in the output value table 13, and produces its content in the form of a full-white pattern address signal W_AD.

A target pixel CPX and an image kind judgment signal PSL are supplied to the selector 101. Based on these signals, the selector 101 produces an address signal AD_L and the a final-stage selection signal F_SEL as shown in Table 2.

TABLE 2

| | A_MT | PSL | B_MT | C_MT | CPX | F_SEL | AD_L |
|---|---|---|---|---|---|---|---|
| (a) | 1 | — | — | — | — | 1 | A_AD |
| (b) | 0 | 1 | — | — | 1 | 0 | — |
| (c) | 0 | 1 | — | — | 0 | 1 | W_AD |
| (d) | 0 | 0 | 1 | — | — | 1 | B_AD |
| (e) | 0 | 0 | 0 | 1 | — | 1 | C_AD |
| (f) | 0 | 0 | 0 | 0 | 1 | 0 | — |
| (g) | 0 | 0 | 0 | 0 | 0 | 1 | W_AD |

3. Operation of Embodiment 3.1 Processing on Black Characters, Line Drawing, etc.

The operation of the image processing device of this embodiment will be described. The image processing device of this embodiment operates differently depending on the kind of input image data. First, a description will be made of a case where multi-valued image data inputted to the TRC conversion circuit 1 consists of only black characters, a line drawing, and the like.

Where multi-valued image data does not contain a halftone area, the output value of the TRC conversion circuit 1 takes a maximum value or a minimum value on the vertical axis of FIG. 14. The binarizing circuit 2 does not form an error diffusion image or the like, but produces binary image data corresponding to the pattern of the multi-valued image data itself, which are sequentially stored into the FIFO buffer 3.

The matrix generating circuit 5 extracts a 17×9 matrix containing a target pixel CPX at its center. The black-pixel counting circuit 7 counts the number BK1 of black pixels, and the black/white changing point counting circuit 8 counts the number CHI of black/white changing points. When the binary image data consists of only black characters, a line drawing, and the like, usually the image kind judgment signal PSL is "0".

If the 17×9 matrix satisfies a pattern condition belonging to the pattern group A, the selector 101 sets the final-stage selector selection signal F_SEL at "1", and sets the address signal AD_L to the group-A address signal A_AD ((a) in Table 2). As a result, the output value table 13 is accessed by the group-A address signal A_AD, so that corresponding pixel correction values are outputted from the output value table 13. Finally, a smoothed image is outputted from an image output device (not shown).

When no pattern condition of the pattern group A is satisfied but a pattern condition of the pattern group B is satisfied, the address signal AD_L is set to the group-B address signal B_AD ((d) in Table 2). Similarly, when no pattern condition of the pattern groups A and B is satisfied but a pattern condition of the pattern group C is satisfied, the address signal AD_L is set to the group-C address signal C_AD ((e) in Table 2).

That is, when the output-value table 13 is accessed by these address signals, smoothing or the like is applied to produce an output image. More specifically, the image data is smoothed by use of the pattern groups A and B, and the inside of black characters and a line drawing are set to a full-black pattern by use of the pattern group C.

When the "17×9" matrix does not satisfy any pattern condition, different processing is performed depending on the value of the target pixel CPX. To be more specific, when the target pixel CPX is "0" (white pixel), a full-white pattern address signal W_AD is outputted as the address signal AD_L ((g) in Table 2) and a corresponding portion of an output image becomes white. When the target pixel CPX is "1" (black pixel), the final-stage selector selection signal F_SEL becomes "0" and, as a result, an address signal AD_M outputted from the look-up table 11 is supplied to the output value table 13.

3.2 Processing for Halftone Image

A description will be made of how the image processing device operates when the multi-valued image data inputted to the TRC conversion circuit 1 represents a halftone image.

When halftone image is supplied to the TRC conversion circuit 1, the gradation conversion is performed according to characteristic B shown in FIG. 14. The gradation-converted multi-valued image data is then converted into an error diffusion image by the binarizing circuit 2.

The matrix generating circuit 5 extracts a 17×9 matrix containing a target pixel CPX at the center thereof. The black pixel counting circuit 7 counts the number BK1 of black pixels, and the black/white changing point counting circuit 8 counts the number CH1 of black/white changing points CH1. Since the binary image data represents an error diffusion image, usually the image kind judgment signal PSL becomes "1". In this case, since the smoothing is restricted, it is highly possible that no pattern condition is satisfied.

When no pattern condition is satisfied and the target pixel CPX is "0" (white pixel), the final-stage selector selection signal F_SEL is set at "1" and the address signal AD_L is set to the full-white pattern address signal W_AD ((c) in Table 2). Thus, a corresponding portion of an output image becomes white. On the other hand, when the target pixel CPX is "1" (black pixel), the final-stage selector selection signal F_SEL is set at "0" and, as a result, the address signal AD_M outputted from the look-up table 11 is supplied to the output value table 13.

The address signal AD_M has been so set as to have a corresponding area ratio M according to the relationship shown in FIG. 13. Accordingly, the dot diameter becomes small in a low-density region of the halftone image. That is, in connection with the fact that the TRC conversion circuit 1 has given the multi-valued image data the gradation characteristic indicated by characteristic B of FIG. 14, the dot diameter is controlled as shown in FIG. 13. In this manner, the gradation characteristic as would be obtained with characteristic A of FIG. 14 is finally obtained.

3.3 Halftone Image on Which Black Characters, Line Drawing, or the Like Is Superimposed When black characters, a line drawing, or the like is superimposed on a halftone-image, the image processing device operates in approximately the same manner as in "Processing for Halftone Image" that has been described above.

However, when the target pixel CPX belongs to an edge of a character or the like, it is highly possible that the 17×9 matrix satisfies a pattern condition of the pattern group A. Row (a) in Table 2 indicates that when a pattern condition of the pattern group A is satisfied, the final-stage selector selection signal F_SEL becomes "1" irrespective of the value of the image kind judgment signal PSL and the address signal AD_L is set to the group-A address signal A_AD.

As a result, corresponding pixel correction values are outputted from the output value table 13, and a smoothed image is outputted from the image output device (not shown). Which of the above-described operations should be performed is determined in accordance with the contents of the 17×9 matrix held by the FIFO buffer 3. That is, every time new binary image data is outputted from the binarizing circuit 2 and the contents of the FIFO buffer 3 are updated, the selection states of the selectors 101 and 102 are changed accordingly.

4. Modifications

The invention is not limited to the above embodiment, but various modifications are possible as exemplified below.

1) Although in the above embodiment the binarizing circuit 2 converts a halftone image into an error diffusion image, it may convert a halftone image into a dot-concentration type dither image or a dot dispersion type dither image.

2) In the embodiment, the dot diameter is determined on the basis of the number BK2 of black pixels in a 3×3 matrix and the number BK1 of black pixels of a 17×9 matrix. Alternatively, more matrices may be provided (e.g., a 5×5 matrix is further provided), and the dot diameter may be determined based on the numbers of black pixels in these matrices.

Figures 17, 18:
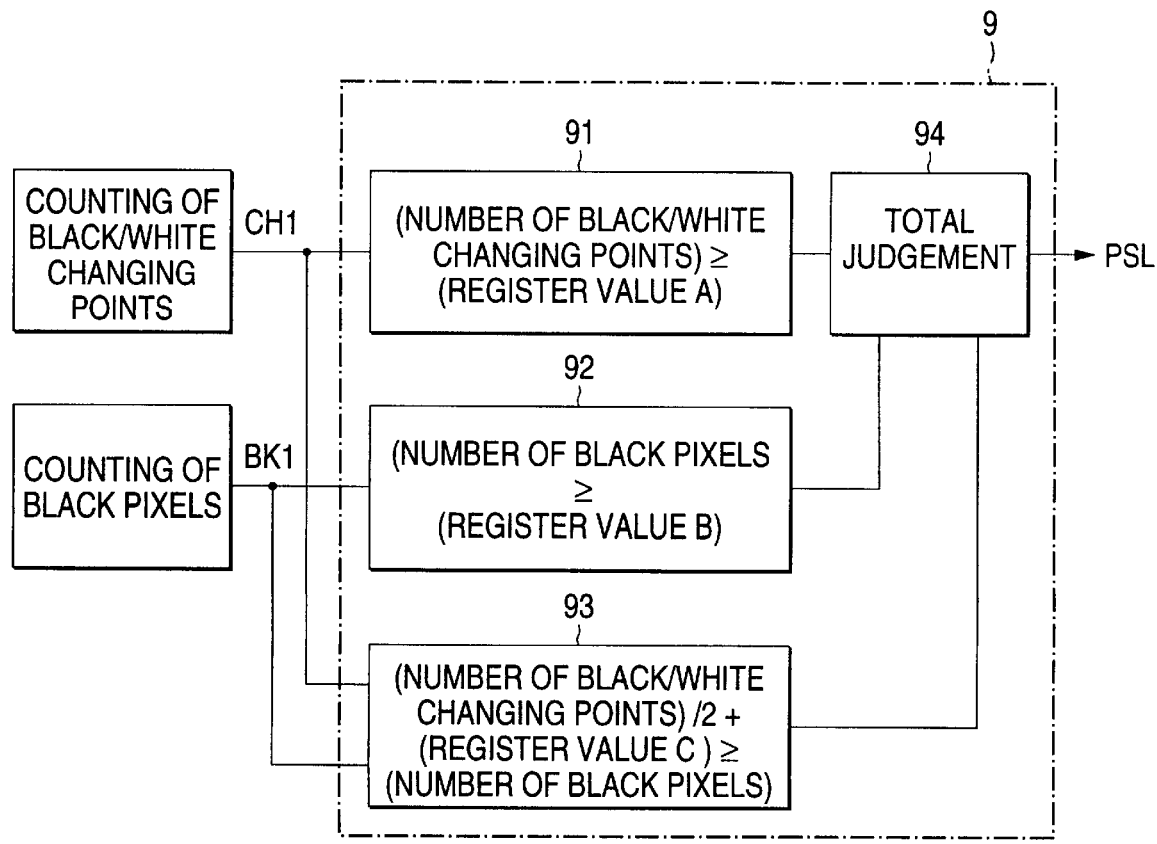
FIG. 17 weighting coefficients used for counting of black pixels in a 5×5 matrix.
FIG. 18 is a block diagram showing an example of a quasi-halftone judging circuit.

3) In the embodiment, black pixels in a matrix is simply counted. Alternatively, black pixels may be counted with weighting coefficients given to the respective pixels. In the case of a 5×5 matrix, weighting coefficients as shown in FIG. 17 may be used.

4) In the embodiment, multi-valued image data outputted from the TRC conversion circuit 1 is converted into binary image data by the binarizing circuit 2, and binary image data held by the FIFO buffer 3 is converted into multi-valued image data by using the look-up table 11. It goes without saying that multi-valued image data may be used in place of the binary image data. The present invention is operable if a condition N<M is satisfied where N is the number of gradation levels of the multi-valued image data stored in the FIFO buffer 3 and M is the number of gradation levels of the multi-valued image data determined by the address signal AD_M.

5) Although in the embodiment the quasi-halftone judging circuit 9 is implemented by a look-up table, it may be constructed as another type of logic circuit. For example, the judgment condition of FIG. 10C may be realized by a circuit shown in FIG. 18. In the circuit of FIG. 18, a judging circuit 91 judges whether the number CH1 of black/white changing points is larger than or equal to a preset value A. A judging circuit 92 judges whether the number BK1 of black pixels is larger than or equal to a preset value B (for the preset values A and B, reference is made to FIG. 10C). A judging circuit 93 judges whether the sum of ½ of the number CH1 of black/white changing points and a preset offset value C is larger than or equal to the number BK1 of black pixels (the offset value C is "0" in FIG. 10C). A total judging circuit 94 processes the results of the judgments made by the judging circuits 91–93 and produces an image kind judgment signal PSL.

6) In the embodiment, the quasi-halftone judging circuit 9, the pattern matching circuit 10 and other circuits are used for the smoothing, while the look-up table 11 and other circuits are used for the dot diameter control. The selector 12 selects one of the two kinds of processing. However, the objects of selection are not limited to the smoothing and the dot diameter control, but may be other kinds of image processing.

7) In the embodiment, the black-pixel counting circuits 6 and 7 count black pixels as the terms indicate. However, if the number of white pixels within a preset area is determined, the number of black pixels is uniquely determined. Therefore, white pixels, in place of black pixels, may be counted, as a matter of course. Similarly, a ratio of the number of black pixels to the total number of pixels in a preset area, a ratio of the number of white pixels to the total number of pixels in a preset area, the sum of pixel values (for example, a black pixel has a value "1" and a white pixel has a value "0"), or an average of pixel values may be used in place of the number of black pixels.

8) In the embodiment, the dot diameter control is carried out so that the diameter of dots as finally outputted (onto a printing sheet, for example) is varied in accordance with the image density. However, where a xerographic image output device used, this technique may be used to obtain uniform dot diameters, rather than to vary the dot diameter positively.

As pointed out in the prior art description, in a xerographic image output device, the dot diameter may increase in a low-density region even if dots have the same side in the state of an electrostatic latent image. In this case, to make dot diameters uniform independently of the image density, it is necessary to reduce the size of dots in a low-density region in the state of an electrostatic latent image. This type of control can be performed in the same manner as described in "Dot Diameter Control" of the embodiment.

As described above, the image processing device of the invention can improve the image quality by an extremely simple process in which the dot area of a target pixel is controlled in accordance with the density of a first area.

What is claimed is:

1. An image processing device comprising:
   first area determining means for determining a first area around a target pixel of binary image data;
   first density calculating means for calculating a density of the determined first area based on pixel values in the first area, a first pixel value being assigned to every black pixel in said first area and a second pixel value being assigned to every white pixel in said first area; and
   dot area control means for controlling a dot area of the target pixel so that the dot area of the target pixel becomes smaller as the calculated density of the first area becomes smaller.

2. The image processing device according to claim 1, further comprising converting means for converting multi-valued image data to the binary image data while setting a number of dots in a unit area in accordance with a density of the multivalued image data, wherein the first area determining means determines the first area in the binary image data as produced by the converting means.

3. The image processing device according to claim 2, wherein the converting means converts the multi-valued image data in accordance with a density of image data as subjected to dot area control of the dot area control means.

4. The image processing device according to claim 2, wherein the converting means converts the multi-valued image data so that a density of image data as subjected to dot area control of the dot area control means becomes equal to a density of image data that has not been subjected to the dot area control of the dot area control means.

5. The image processing device according to claim 2, wherein the converting means converts the multi-valued image data so as to increase a density of a low-density portion of the binary image data.

6. The image processing device according to claim 2, wherein the converting means converts the multi-valued image data by an error diffusion method.

7. The image processing device according to claim 1, wherein the first density calculating means calculates a ratio of a number of black pixels or white pixels to a total number of pixels in the first area.

8. The image processing device according to claim 1, wherein the first density calculating means calculates a sum of the pixel values in the first area.

9. The image processing device according to claim 1, wherein the first density calculating means calculates an average of the pixel values in the first area.

10. The image processing device according to claim 1, further comprising weighting means for weighting the pixel values in the first area.

11. The image processing device according to claim 1, further comprising:

judging means for determining whether the target pixel is a pixel constituting a character or a line drawing; and operation inhibiting means for inhibiting operation of the dot area control means on the target pixel when the target pixel is judged to be the pixel constituting a character or a line drawing.

12. The image processing device according to claim 1, further comprising:

second area determining means for determining a second area around the target pixel, the second area having a different size than the first area; and second density calculating means for calculating a density of the determined second area based on pixel values in the second area, said first pixel value being assigned to every black pixel in said second area and said second pixel value being assigned to every white pixel in said second area, wherein the dot area control means controls the dot area based on the densities calculated by the first and second density calculating means.

13. An image processing method comprising the steps of:

determining a first area around a target pixel of binary image data;

calculating a density of the determined first area based on the pixel values in the first area, a first pixel value being assigned to every black pixel in said first area and a second pixel value being assigned to every white pixel in said first area; and controlling a dot area of the target pixel so that the dot area of the target pixel becomes smaller as the calculated density becomes smaller.

14. The image processing device according to claim 1, further including:

means for determining whether said target pixel is a white pixel or a black pixel, and said dot area control means controlling a dot area of said target pixel when said target pixel is determined to be a black pixel.

* * * * *